(12) United States Patent
John

(10) Patent No.: US 6,752,351 B2
(45) Date of Patent: Jun. 22, 2004

(54) LOW MASS FLOW REACTION JET

(75) Inventor: Lawrence E. John, Inyokern, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/287,020

(22) Filed: Nov. 4, 2002

(65) Prior Publication Data

US 2004/0084564 A1 May 6, 2004

(51) Int. Cl.⁷ .................... F41G 7/00; F42B 15/00
(52) U.S. Cl. ............... 244/3.22; 244/3.15; 244/3.21; 244/51; 244/52; 244/62
(58) Field of Search .................. 244/3.1–3.3, 51–61, 244/53 A–53 B, 62, 73 R, 74, 73 B, 73 C

(56) References Cited

U.S. PATENT DOCUMENTS

| | | | | |
|---|---|---|---|---|
| 3,028,807 A | * | 4/1962 | Burton et al. ............... | 244/3.13 |
| 3,305,194 A | * | 2/1967 | Conard et al. ............. | 244/3.21 |
| 3,365,147 A | * | 1/1968 | Wolfe ........................ | 244/3.22 |
| 3,446,023 A | * | 5/1969 | Mosier ...................... | 244/3.22 |
| 3,612,442 A | * | 10/1971 | Chisel ........................ | 244/3.22 |
| 3,614,027 A | * | 10/1971 | Lewis ........................ | 244/3.22 |
| 3,637,167 A | | 1/1972 | Froning, Jr. et al. | |
| 3,802,190 A | * | 4/1974 | Kaufmann .................. | 244/3.22 |
| 3,854,678 A | | 12/1974 | Geres | |
| 3,977,629 A | * | 8/1976 | Tubeuf ...................... | 244/3.22 |
| 4,408,735 A | * | 10/1983 | Metz .......................... | 244/3.22 |
| 4,463,921 A | * | 8/1984 | Metz .......................... | 244/3.22 |
| 4,482,107 A | * | 11/1984 | Metz .......................... | 244/3.22 |
| 4,531,693 A | | 7/1985 | Raynaud et al. | |
| 4,648,571 A | | 3/1987 | Gerhardt | |
| 4,712,748 A | * | 12/1987 | Schafer ...................... | 244/3.22 |
| 4,928,906 A | * | 5/1990 | Sturm ........................ | 244/3.22 |
| 4,967,982 A | * | 11/1990 | Bagley ...................... | 244/3.22 |
| 5,054,712 A | * | 10/1991 | Bar et al. .................. | 244/3.22 |
| 5,123,611 A | * | 6/1992 | Morgand .................... | 244/3.22 |
| 5,129,604 A | * | 7/1992 | Bagley ...................... | 244/3.22 |
| 5,238,204 A | * | 8/1993 | Metz .......................... | 244/3.15 |
| 5,657,948 A | * | 8/1997 | Roucoux .................... | 244/3.22 |
| 6,109,565 A | | 8/2000 | King, Sr. | |
| 6,178,741 B1 | * | 1/2001 | Nelson et al. ............. | 244/3.22 |
| 6,267,326 B1 | * | 7/2001 | Smith et al. ............... | 244/3.22 |
| 6,315,238 B1 | * | 11/2001 | Kirschner, Jr. ............. | 244/3.22 |
| 6,347,763 B1 | * | 2/2002 | Harkins et al. ............. | 244/3.21 |
| 6,478,250 B1 | * | 11/2002 | Adams et al. ............. | 244/3.23 |

* cited by examiner

*Primary Examiner*—Bernarr E. Gregory
(74) *Attorney, Agent, or Firm*—Laura R. Foster

(57) ABSTRACT

A control system for a flying vehicle in an atmospheric environment, the vehicle having an aerodynamic shape including a front end and a rear end including a plurality of attitude control jet nozzles spaced outward from the vehicle near the rear end of the vehicle or a trailing edge of a vehicle part; and a generator for providing a low mass flow of a fluid through the attitude control jet nozzles to create an area of high pressure immediately forward of the nozzles and adjacent the flying vehicle, wherein the location of the attitude control jet nozzles is so close to the rear end of the vehicle that any area of low pressure created by the low mass flow of fluid through the attitude control jet nozzles does not contact the vehicle.

5 Claims, 9 Drawing Sheets

LOW MASS FLOW REACTION JET

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefore.

BACKGROUND OF THE INVENTION

1. Field of the Invention

This invention pertains to the field of vehicle control. More particularly, it pertains to a control system for a rocket or jet-propelled vehicle traveling through the layer of air surrounding the earth.

2. Description of the Prior Art

In the field of control systems for vehicles traveling through the air or atmosphere, such as air-to-air rockets, the prior art has used control surfaces that move from the surface or from interior the vehicle into the air stream or "freestream" to divert some of the dynamic air flow and develop a turning moment, about the center of gravity of the vehicle, that will turn the vehicle from its present course to a new heading. In addition, there are other control systems utilizing hardware to change the direction of flow of the propulsion means, such as a rocket nozzle, a propeller direction, or a jet exhaust, by rotating the nozzle or the entire motor. Still further, there are other control systems that utilize lateral gaseous jets to induce transverse forces to change the course of the vehicle. In virtually all of these prior art uses, there is a large requirement for machinery, such as levers, bearings, shafts, wheels, arms, valves and the like that are bulky, heavy, and take up space in the vehicle that could be put to better use.

For instance, in the prior art of this latter mentioned control system, U.S. Pat. No. 3,637,167 issued to Froning, Jr. et al. on Jan. 25, 1972 discloses the combination of an elongated jet nozzle, located between control vanes of a rocket, to produce additional or channeled flow of air over the control vanes to provide secondary or augmented aerodynamic control during the time of required high "G" maneuvering which occurs most likely during the initial launch period or near the end of the flight of an air-to-air missile.

U.S. Pat. No. 3,854,678 issued to Geres on Dec. 17, 1974 discloses a guidance control involving the use of a compressed gas passed through slots along the trailing edge of a wing attached to a gravity vehicle wherein the gas is diverted upward or downward, from the plane of the wing, to control the pitch and roll of the missile, to increase the lift-to-drag ratio of the wing, and give a measure of additional accuracy to the bomb.

U.S. Pat. No. 4,531,693 issued to Raynaud et al. on Jul. 30, 1985 discloses the placement of a plurality of gaseous attitude control jets about the surface of a missile where the jet exhaust is controlled by a nozzle to create an oblong shaped jet lying in a plane including the longitudinal axis of the missile.

U.S. Pat. No. 4,648,571 issued to Heinz on Mar. 10, 1987 discloses the use of transverse jet flow along the rear edge of an airplane wing to promote greater airflow over the wing in the direction of the main axis of the airplane to augment the lifting and control capability of short takeoff and landing aircraft.

U.S. Pat. No. 6,109,565 issued to King, Sr. on Aug. 29, 2000 discloses the use of jet flow passed across the top of, and rearward, over a lifting surface or wing and, simultaneously, across the bottom and forward, of the same wing to decrease the pressure on top of the wing and increase the pressure on the bottom of the wing to increase the overall lift capability of the wing at comparable slower forward speeds of the vehicle to which the wing is attached.

SUMMARY OF THE INVENTION

Accordingly, the main object of this invention is the use of a plurality of small jet nozzles arranged in a specific pattern to provide augmentation to a reactive jet action taken on a flying vehicle that requires less in terms of overall mass fluid flow than prior art devices. Other objects of the invention is an augmentation system that does not require large fluid flows, a system that is devoid of the low pressure areas developed by reaction jets that are used along the sides of flying vehicles, and a means of reducing the overall weight and requirement for steering equipment in a flying vehicle.

These and other objects of the invention will be shown by a close reading of the following Description of the Preferred Embodiment taken together with the drawings appended hereto. The scope of protection sought by the inventor may be gleaned from a close reading of the claims that conclude this patent specification.

DESCRIPTION OF THE PREFERRED EMBODIMENT

Figure 1:
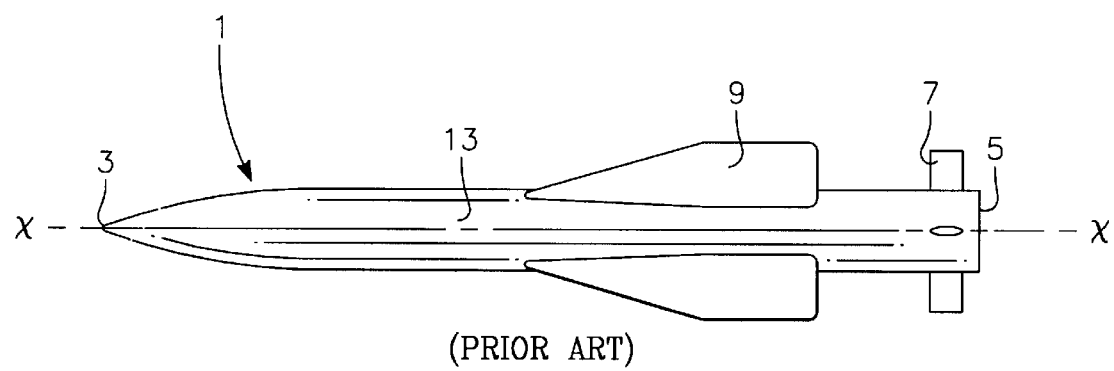
FIG. 1 is a side illustrative view of a typical aerodynamic vehicle for which this invention is applicable.
Figure 2:
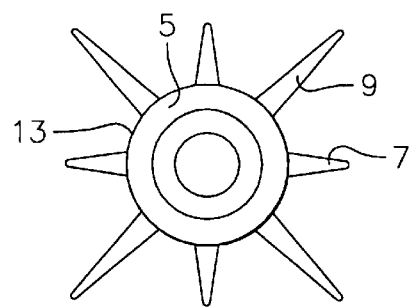
FIG. 2 is a rear end view of the vehicle shown in FIG. 1.

Turning now to the drawings wherein elements are identified with numbers and like elements are identified with like numbers throughout the 12 figures, FIGS. 1 and 2 show a typical jet-propelled or rocket-propelled flying vehicle 1 having an aerodynamic shape including a front end 3 and a rear end 5 and having flight control vanes 7 and wings 9 located along the body 13 of said vehicle. It is not important nor required in this invention that vanes 7 and/or wings 9 be associated with vehicle 1, and are only placed in FIG. 1 to show their association with vehicles that travel in an atmosphere.

Figure 3:
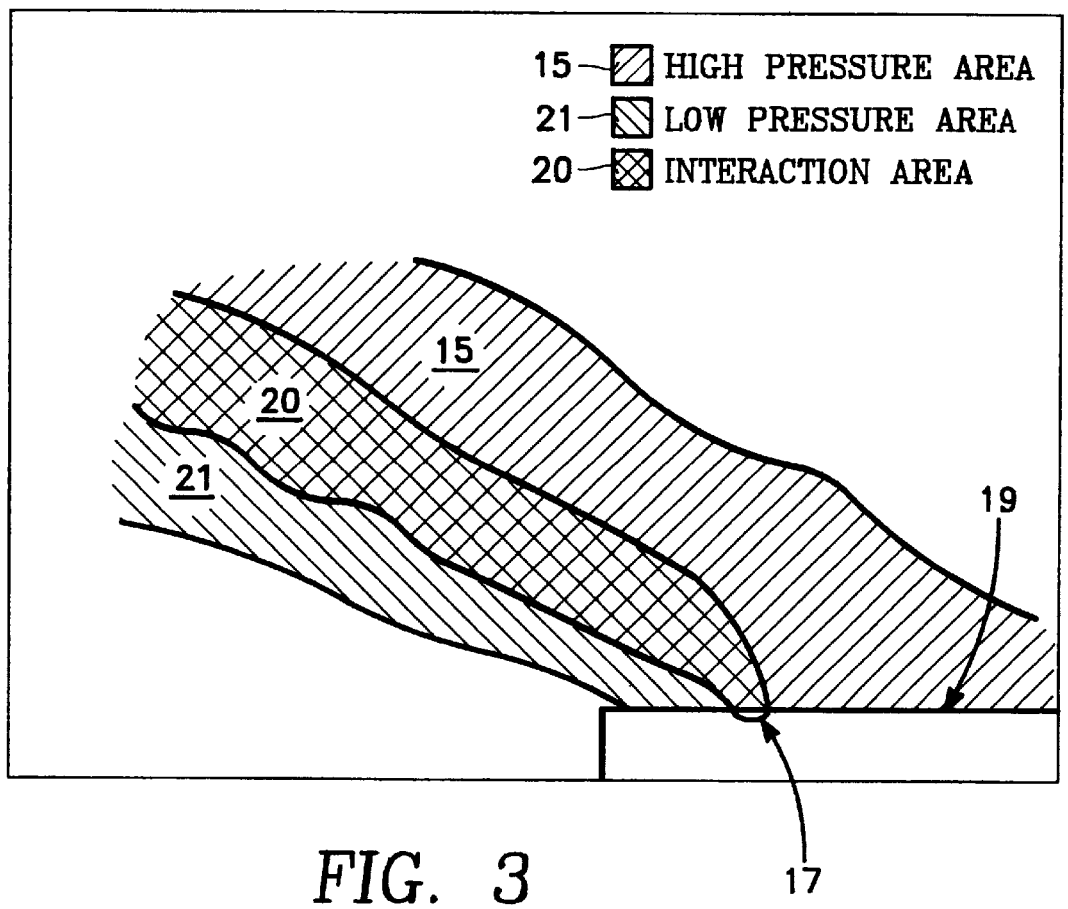
FIG. 3 is a drawing illustrating the high pressure region and low pressure region developed at the nozzle of this invention.
Figure 4:
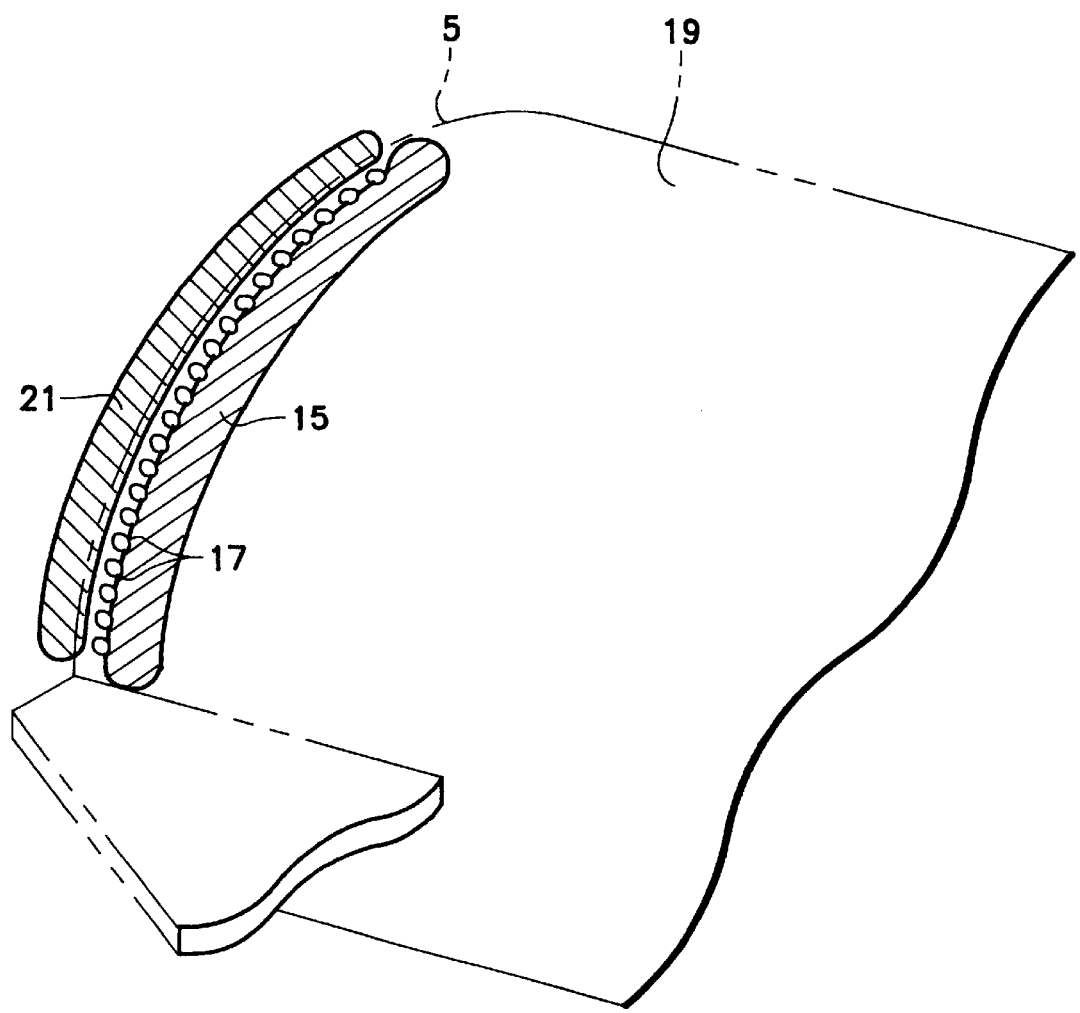
FIG. 4 is a drawing of a portion of the rear end of the vehicle shown in FIG. 1 depicting the region of high pressure and the region of low pressure developed at the end of the vehicle by the practice of this invention.

The invention is based upon the discovery that a jet, acting orthogonal to the main axis x-x of a vehicle in an atmospheric environment, not only causes a reactive push in the direction opposite the jet, pursuant to Newton's second law of motion, but, in addition, as shown in FIGS. 3 and 4, causes a region 15 of high (greater than ambient) pressure to develop immediately forward of a plurality of jet nozzles 17, as the jet exhaust exits vehicle body 13. Region 15 of high pressure, shown in FIGS. 3 and 4, develops adjacent the outside surface 19 of body 13 of vehicle 1. Region 15 of high pressure aids or augments the reactive push of the jet against vehicle 1 and can be harnessed to provide an additional turning force against vehicle body 13 without any requirement for exterior guidance hardware. FIG. 3 is a side view of the outside surface of body 13 of vehicle 1 depicting the interaction 20 of the flow from the jet nozzles with the freestream flow as well as the areas of high and low pressure.

Figure 5:
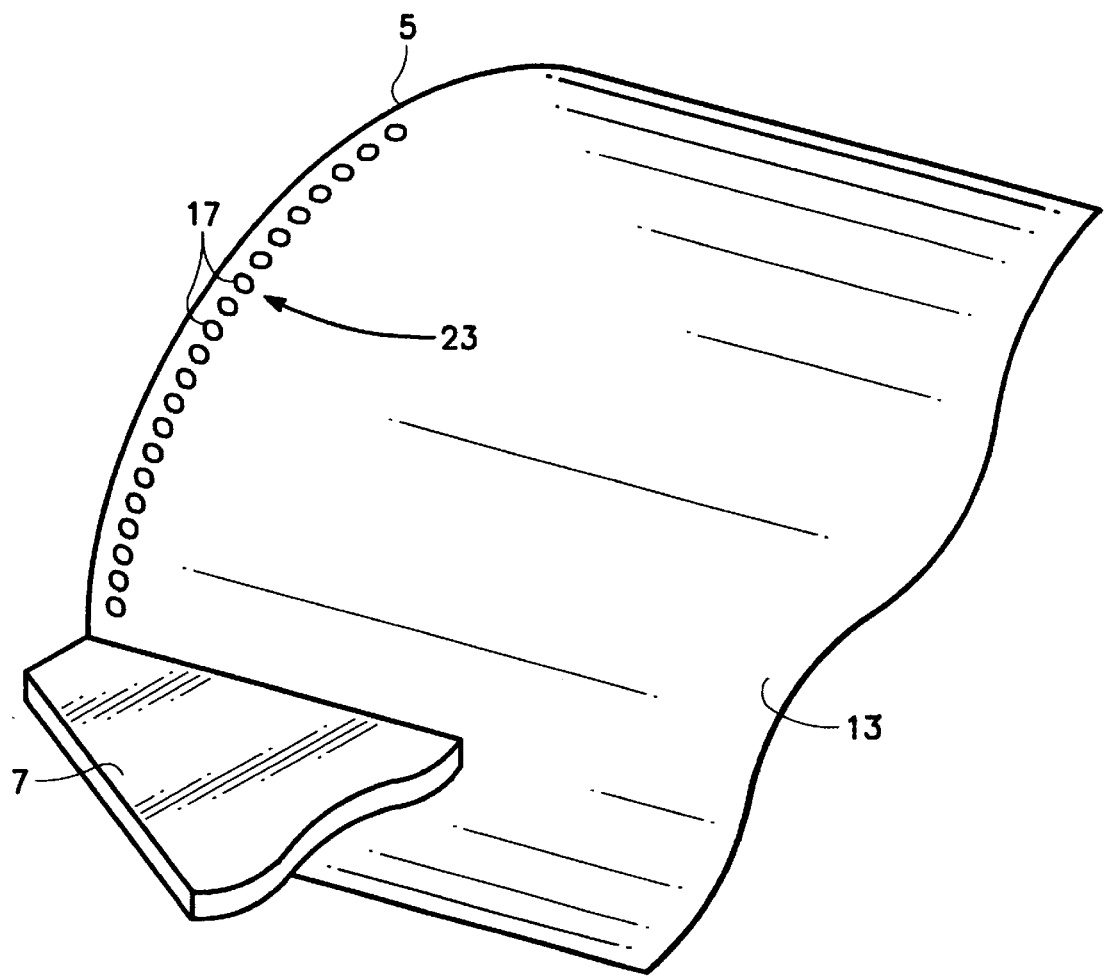
FIG. 5 is a drawing of the preferred embodiment of the placement of a quadrant of nozzles according to the teachings of this invention.

Unfortunately, and as shown in FIGS. 3 and 4, slightly behind and downstream of orifices or jet nozzles 17 a region 21 of reduced/low (less than ambient) pressure is simultaneously developed that, as expected, operates to deteriorate or even cancel out region 15 of increased pressure that is developed ahead of jet nozzles 17. To overcome this potential disadvantage, this invention contemplates locating orifices and jets 17 at the extreme rear end 5 of vehicle 1, as shown in FIG. 5, at the end of body 1 so that any region of low pressure is developed in the freestream behind vehicle 1 and out of contact with vehicle body 13 to have no effect, negative or otherwise, on vehicle 1. In another embodiment the effectiveness of the present invention is not limited to the extreme rear end of the vehicle but the present invention may be applied at any trailing edge of a vehicle part such as a wing or a fin.

Further, it has been found that a plurality of small orifices or jet nozzles 17, (sized smaller than the size of a single jet required to produce the same effect as the plurality of jets), such as shown in a line in FIG. 5, positioned close together, acts in the atmosphere or freestream, as if one very large orifice or jet were present. It has been demonstrated that, by using a number of small orifices 17, the total required amount of fluid through the orifices or jets 17 is considerably less than through one large orifice. This means that the same augmentation can be obtained using a plurality of small orifices, as shown in FIG. 5, with a very reduced fluid flow and can save the weight and hardware that would be required to make a similar force using a large flow for passing through one large orifice. This reduced fluid flow (also known as low mass flow) has a mass that is less than the mass of fluid flow that would be required by a single jet to produce a similar force. Further it has been found that the interaction of the air flow around the plurality of small orifices increases the augmentation beyond what would be achieved with a single jet. These effects are demonstrated in FIG. 7, which graphically shows the array or line of jets to be much more effective than a single jet, and very effective when the jets are not used at all.

Figure 6A:
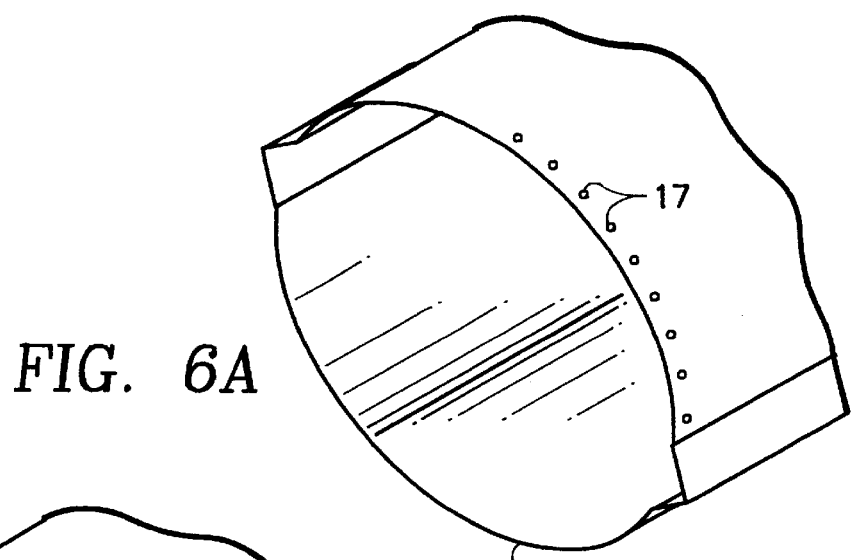
FIG. 6a is a drawing of the placement of 9 nozzles at the rear end of the vehicle.
Figure 6B:
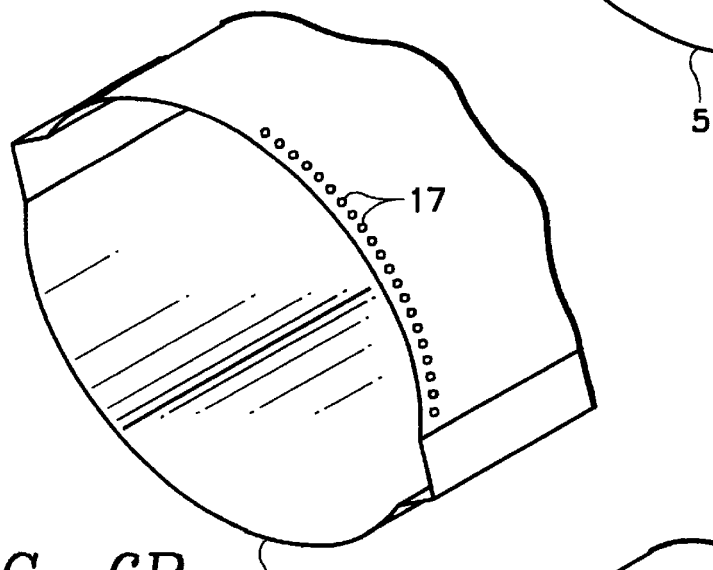
FIG. 6b is a drawing of the placement of 21 nozzles at the rear end of the vehicle.
Figure 6C:
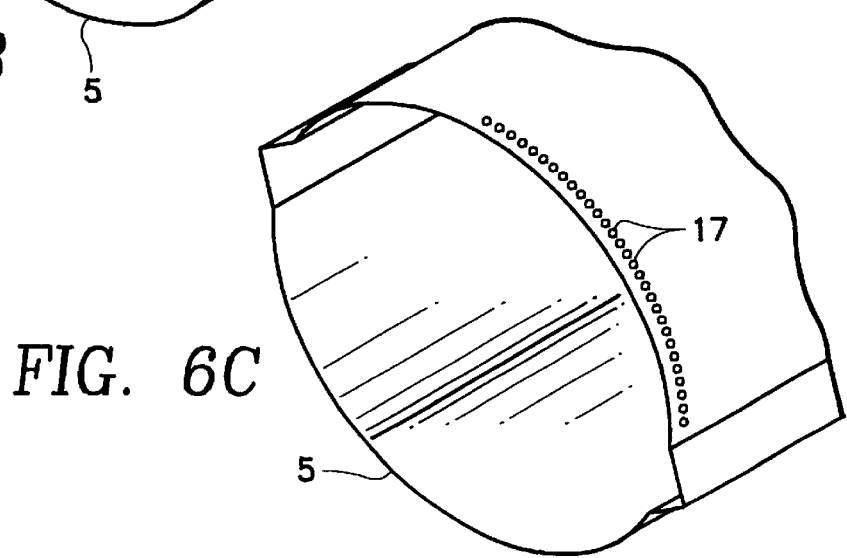
FIG. 6c is a drawing of the placement of 31 nozzles at the rear end of the vehicle.

More particularly, it has been found that when attitude control jet nozzles 17 are arranged in a single line 23 orthogonal to the main axis x-x of vehicle 1, as shown in FIG. 5, and located at the extreme rear end 5 of flying vehicle 1, (that is, as close to the end of the vehicle as can be constructed) the greatest amount of augmentation is developed. As shown by examples in FIGS. 6a, 6b, and 6c, any number of orifices 17 can be placed at the extreme end of vehicle 1 rear end 5 to gain augmentation desired. Nine orifices are shown in FIG. 6a, arranged in a quadrant or on one-fourth of the circumference of vehicle 1 and each is arranged seven diameters apart from its neighbor. Shown in FIG. 6b are twenty-one orifices arranged in the same quadrant of vehicle 1 and are arranged two diameters apart. Shown in FIG. 6c are thirty-one orifices arranged in the same quadrant of vehicle 1 and are arranged one diameter apart. The tables below show examples of a typical number of orifices per quadrant and their desired spacing as well as common characteristics such as orifice diameter and mass flow rates at vehicle speeds of Mach 0.80 and Mach 3.5.

| Number of Orifices Per Quadrant | Spacing Diameters |
| --- | --- |
| 9 | 7 |
| 11 | 5 |
| 16 | 3 |
| 21 | 2 |
| 25 | 1.5 |
| 31 | 1 |

| | |
| --- | --- |
| Orifice Diameter | 0.125 inch |
| $Pressure_{Plenum}$ | 0.90 $Pressure_{total}$ |
| Mass Flow Rate (through each orifice of the invention) at Mach 0.80 | 0.001807 lbm/s |
| Mass Flow Rate (through each orifice of the invention) at Mach 3.5 | 0.007932 lbm/s |

Figure 7:
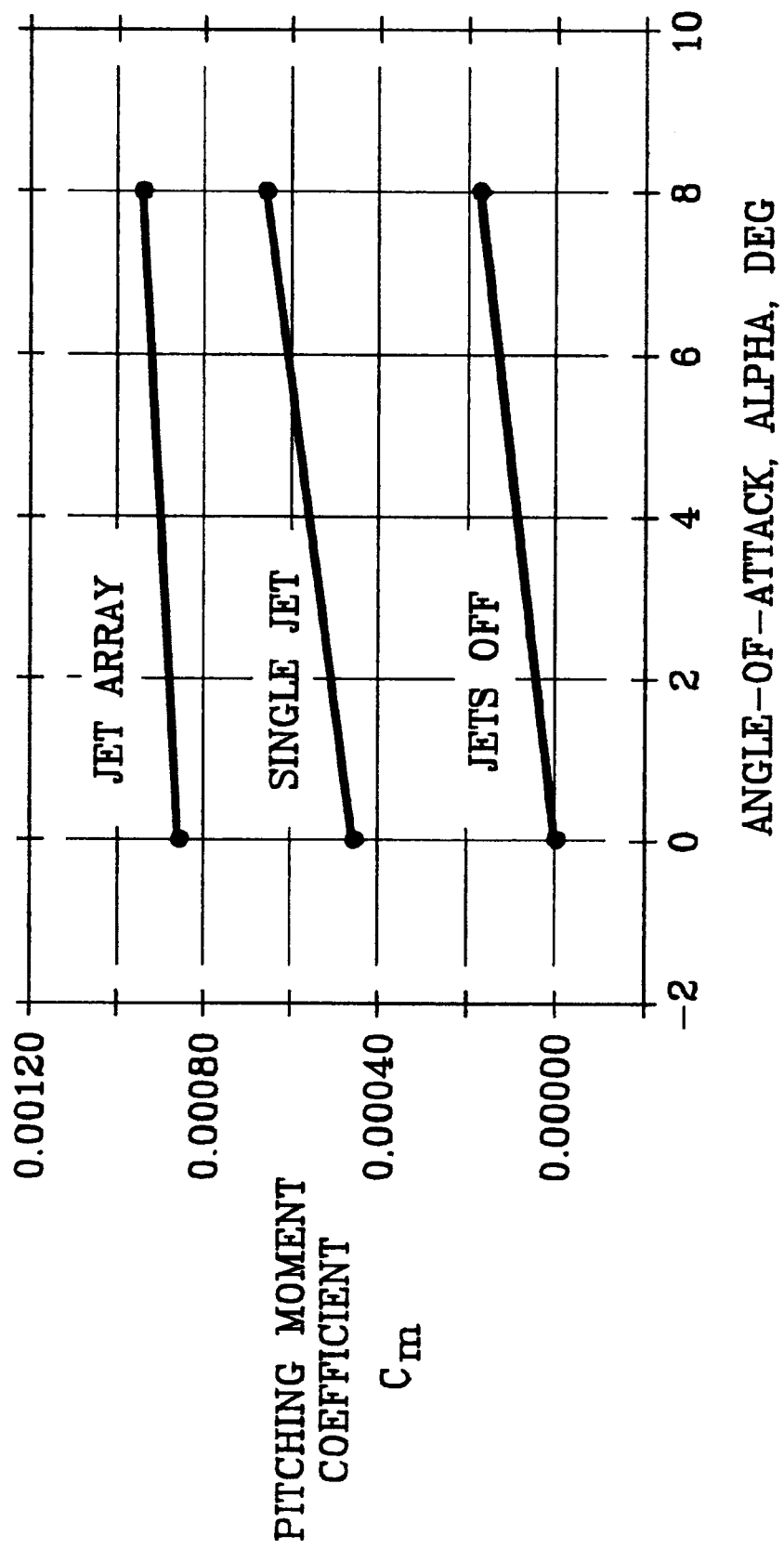
FIG. 7 is a graph of the effectiveness of the practice of this invention on a vehicle.
Figure 8:
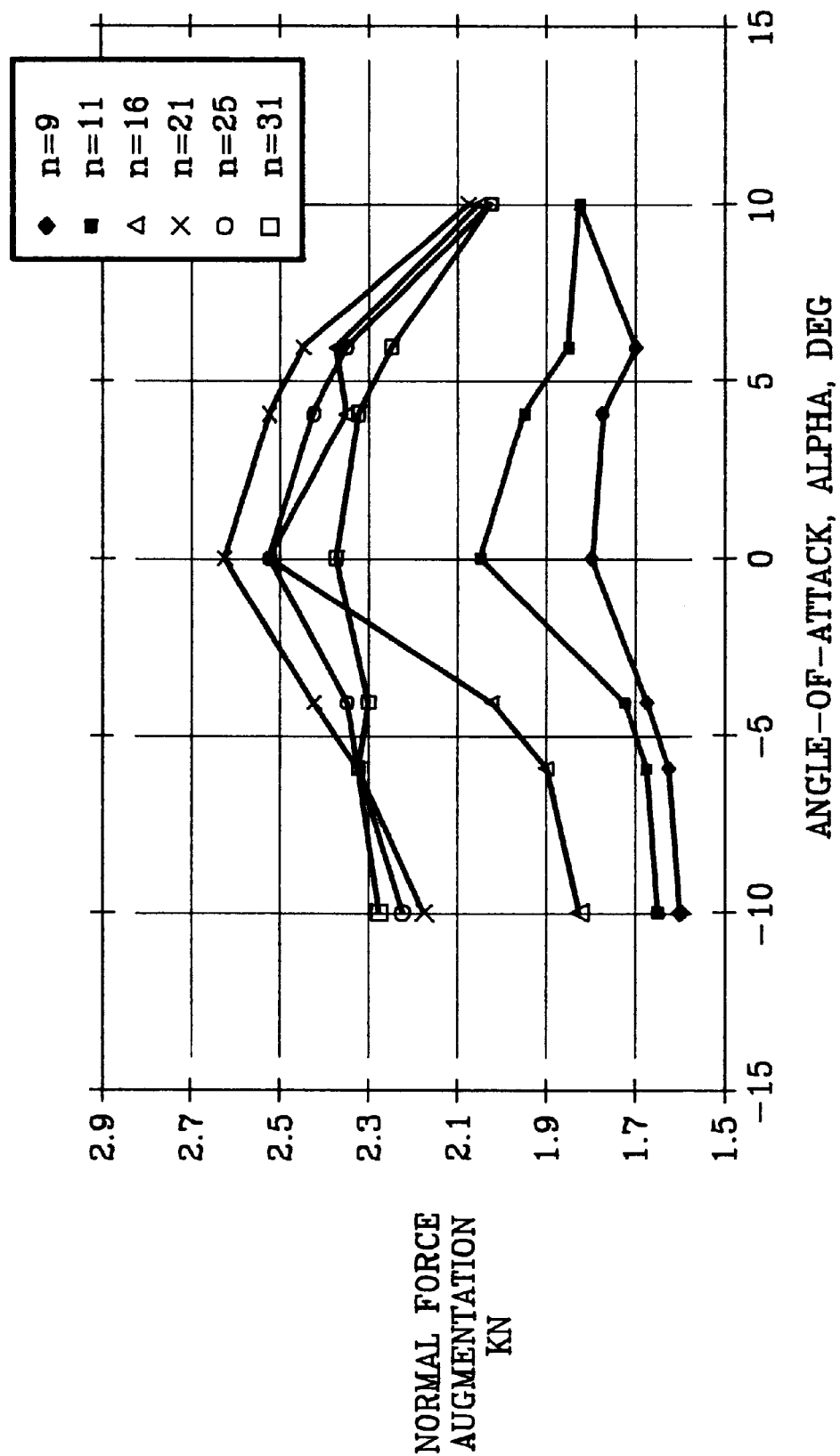
FIG. 8 is a graph detailing the augmentation for varying angles of attack and number of orifices.

Noteworthy is that orifices 17 produce the desired augmentation when they are overall arranged in a single line, orthogonal to the main axis x-x of vehicle 1 and located at the extreme end 5 of flying vehicle 1. The inventor has also determined that the invention is efficacious even when the number of orifices 17, in each quadrant, varies in number from 2 to 31. These test results also show that the invention works well in atmospheric environments where the speed of vehicle 1 is subsonic, transonic, supersonic, and hypersonic. Still further, this invention shows its greatest effect as an augmentation when the angle of attack, that is, the angle between the center line, or axis x-x, of vehicle 1 and the freestream, namely the direction of flow of the air past vehicle body 13, is zero. FIG. 7 shows the improved results of the invention versus a single jet or no jet. As shown in FIG. 8, the augment does vary depending upon the number of orifices 17 and the angle of attack and shows a maximum augmentation with the use of 21 nozzles, at a spacing of 2 orifice diameters, arranged in a single line orthogonal to axis x-x of vehicle 1. It has been found desirable to arrange nozzles 17 in a single line grouped in four quadrants equally spaced about vehicle body 13.

Figure 9:
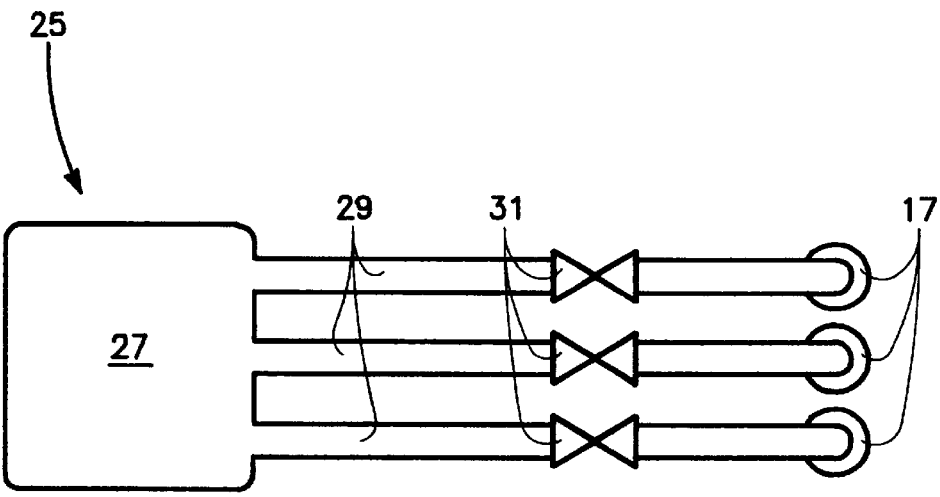
FIG. 9 is a drawing of one manner of developing sufficient fluid to operate this invention.
Figure 10:
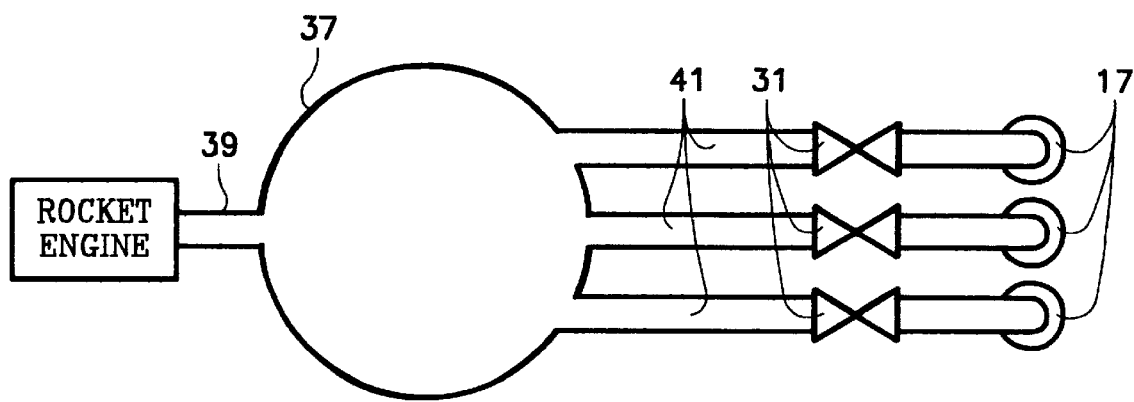
FIG. 10 is a drawing of another manner of developing sufficient fluid to operate this invention.

A means 25, for providing a low mass flow of a fluid through attitude control jet nozzles 17, is shown in FIG. 9. As shown, the source may be an independent generator 27, i.e., not part of the main power source of vehicle 1, that generates a gas (fluid) flow, from decompression of a high pressure gas or the combustion of a burnable material, that is conveyed by tubes 29 to control valves 31 and on to orifices 17. As shown in FIG. 10, the source may be part of the thrust gasses from the main vehicle power source that is captured and conveyed to a plenum tank 37 by a tube 39 where its velocity is reduced and then sent by tubes 41 to control valves 31 and on to orifices 17.

Figure 11:
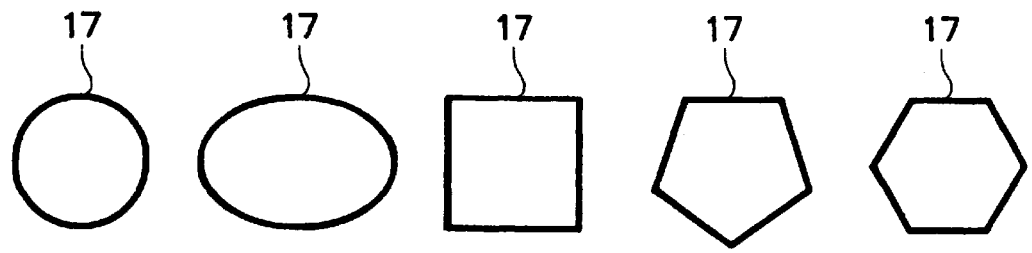
FIG. 11 contains drawings of various geometric outlines of nozzles that can be used in the practice of this invention; and, FIG. 12 is a schematic view of control components of the fluid flow for use in this invention.

Orifices may take a wide variety of regular geometric and non-regular geometric shapes. Shown in FIG. 11 are a series of possible orifice shapes. Other engineering factors come into play with these shapes such as whether any corner of non-rounded shapes will generate cracks in vehicle body 13 over extended use. As shown, the orifice shapes can be circular, oval, rectangular, pentagonal, hexagonal, etc.

Figure 12:
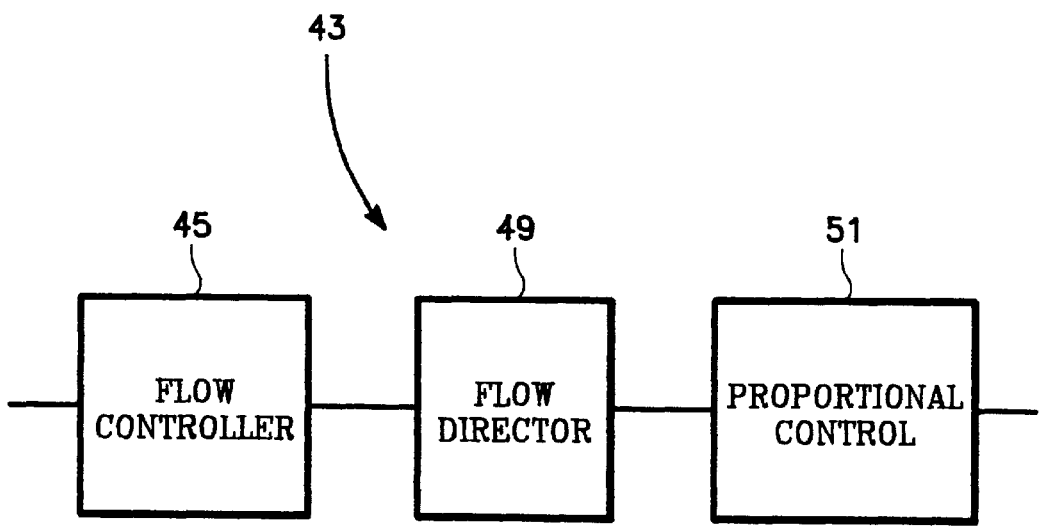

FIG. 12 shows a means 43 for turning on and off the fluid flow to nozzles 17, for directing the fluid flow to specific nozzles 17 while not allowing flow to other nozzles 17, and for controlling the amount of fluid flow that is transported to nozzles 17. This way, means 43 can perform directional control of vehicle 1 while it is traveling in the atmosphere. FIG. 12 shows means 43 to include a controller 45 for turning on and off the fluid flow to nozzles 17, a flow director 49, in series with controller 45, for inputting instructions into the control system, for directing the fluid flow to specific nozzles 17 while not allowing flow to other nozzles 17, and a proportional control 51, attached to said controller 45, for controlling the amount of fluid flow that is transported to nozzles 17.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same result are within the scope of this invention.

What is claimed is:

1. A control system for a flying vehicle in an atmospheric environment, the vehicle having an aerodynamic shape including a front end and a rear end, said control system allowing the overall weight and equipment to be reduced in the vehicle, comprising:
   (a) a plurality of attitude control jet nozzles directed outward from the vehicle, said nozzles being located at the extreme end of the vehicle or the trailing edge of a vehicle part, said nozzles arranged in groups in lines orthogonal to the main axis of the vehicle, wherein the shape of said nozzles is selected from the group of regular geometric shapes;
   (b) means for providing a fluid flow through said nozzles, said fluid flow creating an area of high pressure immediately forward of said nozzles and adjacent to said vehicle;
   (c) said nozzles located at the extreme end or the trailing edge of a vehicle part so that any area of low pressure created by said fluid flow through said nozzles does not contact said vehicle; and,
   (d) said nozzles being dimensioned and configured to provide a similar force as a single attitude jet nozzle while utilizing a fluid flow substantially less than that of said single attitude jet nozzle achieving a similar alternation of the flight path of the vehicle, allowing the overall weight and equipment to be reduced in the vehicle.

2. The control system of claim 1, wherein the number of said nozzles ranges from 2 to about 31 arranged in each group.

3. An aerodynamic, reaction jet-powered vehicle having a vehicle body including a front end and a spaced-apart rear end aligned along a main axis of the vehicle, said vehicle designed for controlled flight in an atmospheric environment, said vehicle having a jet control system for controllably altering the flight path of the vehicle, said control system allowing the overall weight and equipment of said vehicle to be reduced in the vehicle, comprising:
   (a) a plurality of attitude control jet nozzles directed outward from the vehicle, said nozzles being located at the extreme end of the vehicle or the trailing edge of a vehicle part, said nozzles arranged in groups in lines orthogonal to the main axis of the vehicle, said groups spaced equally in quadrants about the vehicle, wherein the shape of said nozzles is selected from a group of regular geometric shapes;
   (b) means for providing a fluid flow through said nozzles, said fluid flow creating an area of high pressure immediately forward of said nozzles and adjacent to said vehicle to augment the reactive force generated by said nozzles upon the vehicle;
   (c) means for controlling the onset, termination, and amount of said flow of fluid to each said nozzles or each of said groups separately to alter the flight path of the vehicle; and,
   (d) said nozzles being dimensioned and configured to provide a similar reactive force as a single attitude jet nozzle while utilizing a fluid flow substantially less than that of said single attitude jet nozzle achieving a similar alternation of the flight path of the vehicle, allowing the overall weight and equipment to be reduced in the vehicle.

4. The control system of claim 3, wherein the number of said nozzles ranges from 2 to 3 in each quadrant.

5. The control system of claim 4 wherein 21 of said nozzles are utilized in each quadrant, at a spacing of 2 nozzle diameters apart.

* * * * *